(12) United States Patent
Lott

(10) Patent No.: US 9,959,204 B1
(45) Date of Patent: May 1, 2018

(54) TRACKING SEQUENTIAL RANGES OF NON-ORDERED DATA

(71) Applicant: Western Digital Technologies, Inc., Irvine, CA (US)

(72) Inventor: Glenn Alan Lott, Berthoud, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 370 days.

(21) Appl. No.: 14/642,666

(22) Filed: Mar. 9, 2015

(51) Int. Cl.
*G06F 7/24* (2006.01)
*G06F 12/06* (2006.01)
*G06F 12/109* (2016.01)

(52) U.S. Cl.
CPC ............ *G06F 12/0684* (2013.01); *G06F 7/24* (2013.01); *G06F 12/109* (2013.01); *G06F 2212/2515* (2013.01); *G06F 2212/657* (2013.01)

(58) Field of Classification Search
CPC ... G06F 7/06–7/36; G06F 12/00–12/16; G06F 13/00–13/4295
See application file for complete search history.

(56) References Cited

U.S. PATENT DOCUMENTS

| | | | |
|---|---|---|---|
| 5,745,418 A * | 4/1998 | Ma | G06F 3/0616 365/185.33 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,141,731 A * | 10/2000 | Beardsley | G06F 12/127 711/133 |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |

(Continued)

OTHER PUBLICATIONS

Lott, "dsk_dcf-block-release.v," Copyright 2002-2012 Western Digital Corporation, pp. 1-16.

(Continued)

*Primary Examiner* — Nicholas Simonetti
(74) *Attorney, Agent, or Firm* — Barry IP Law

(57) ABSTRACT

Embodiments described herein are directed to systems and methods for ordering read sector data that has been returned from a hard disk controller out of order. For example, in typical storage systems, the firmware of the storage system and/or the host interface typically process read sectors in logical block address order. However, some of the data that is received may be received out of order. As such, the disk block hardware within the hard disk controller may accept these out of order sectors from the read channel and subsequently provide information that describes the available sectors that are in order to the firmware and/or the host interface.

19 Claims, 7 Drawing Sheets

(56) References Cited

U.S. PATENT DOCUMENTS

| | | |
|---|---|---|
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,324,594 B1* | 11/2001 | Ellis .................. G06F 13/28 710/24 |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |

(56) References Cited

U.S. PATENT DOCUMENTS

| | | |
|---|---|---|
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCormack |
| 7,542,225 B1 | 6/2009 | Ding et al. |
| 7,548,392 B1 | 6/2009 | Desai |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCormack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kan et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,793,411 B1 * | 7/2014 | Balkan ............... G06F 13/4027 710/52 |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |

(56) References Cited

U.S. PATENT DOCUMENTS

2012/0284493 A1 11/2012 Lou et al.
2013/0120870 A1 5/2013 Zhou et al.
2013/0148240 A1 6/2013 Ferris et al.
2014/0281402 A1 9/2014 Comparan et al.

OTHER PUBLICATIONS

Lott, "dp_lsecc_cnt_release.v" Copyright 2002-2014 Western Digital Corporation, pp. 1-10.

* cited by examiner

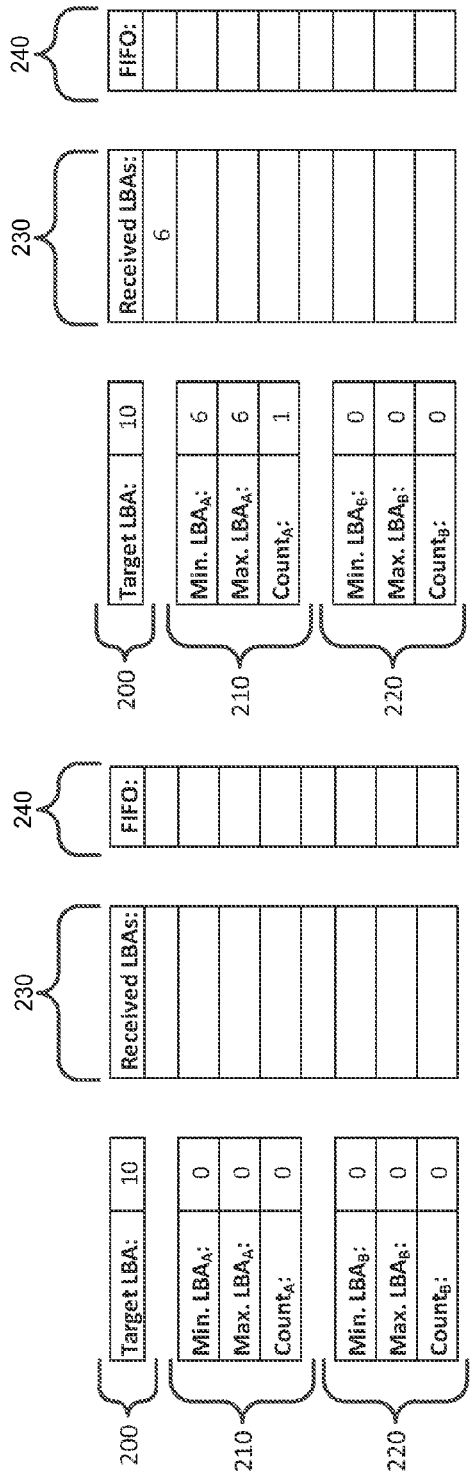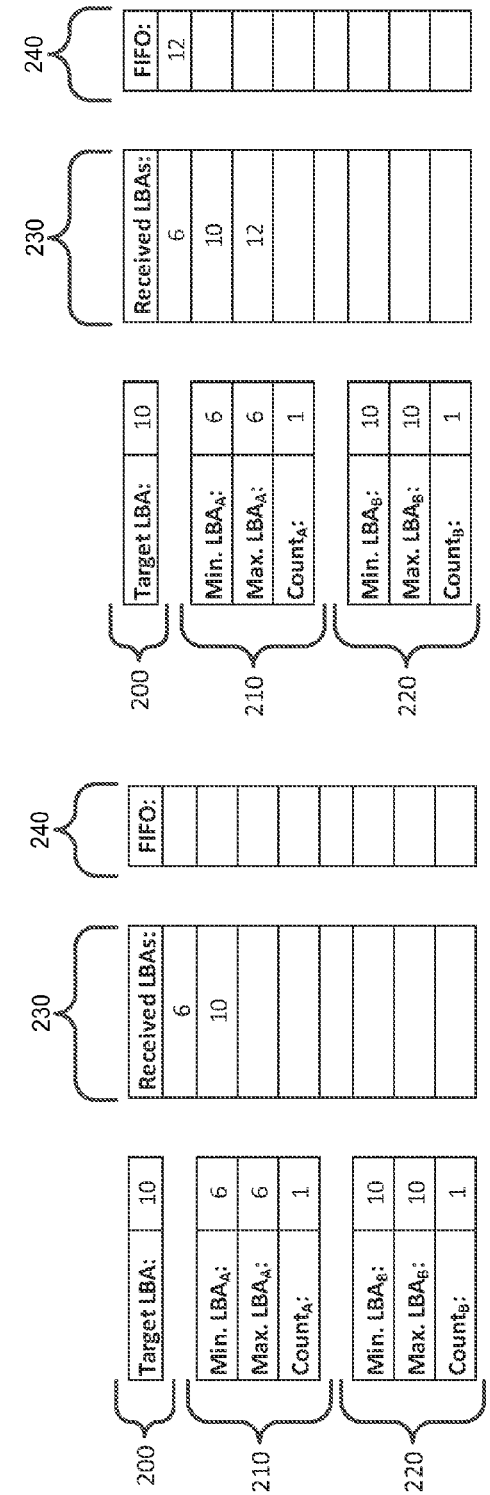

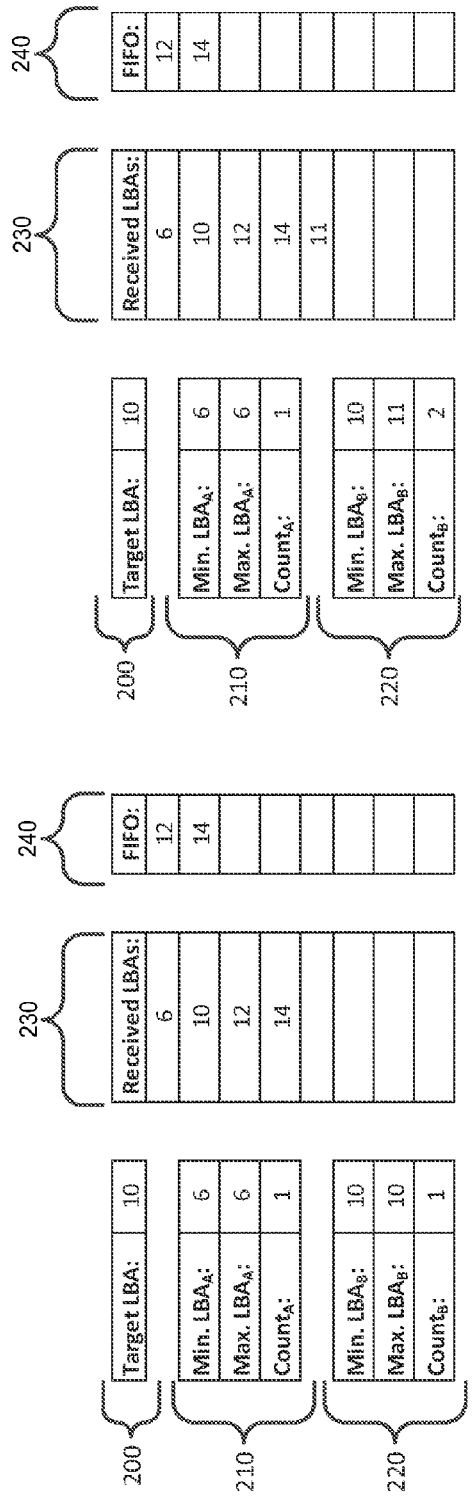
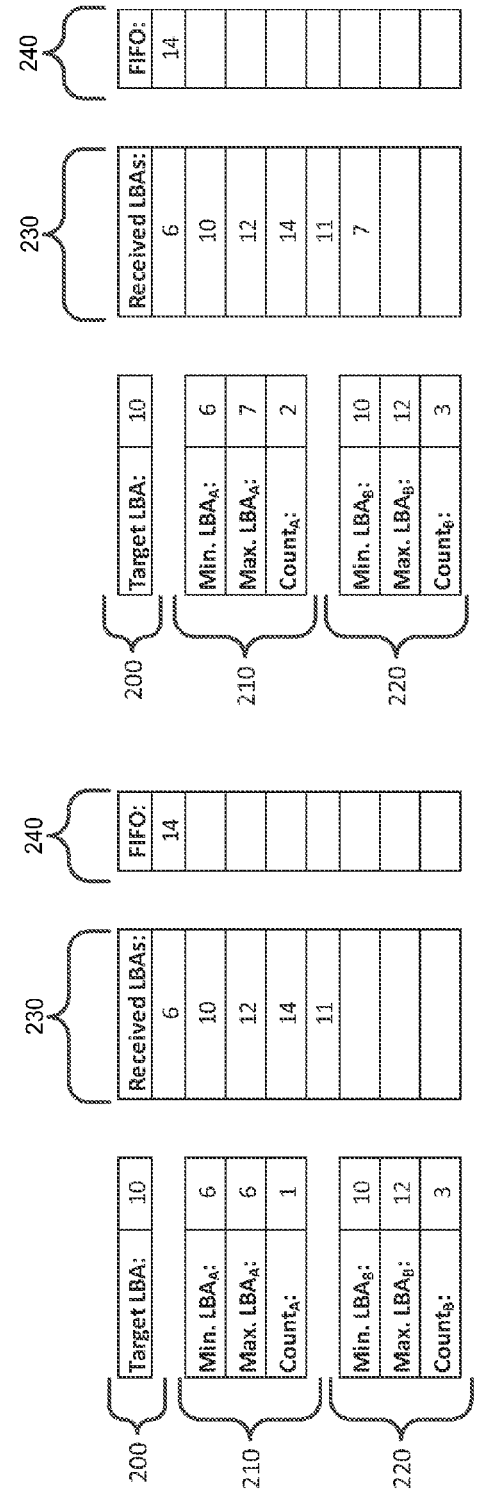
FIG. 2E  FIG. 2F  FIG. 2G  FIG. 2H

TRACKING SEQUENTIAL RANGES OF NON-ORDERED DATA

TECHNICAL FIELD

The present disclosure is directed ordering data in a data storage system. More specifically, the present disclosure is directed to enabling data received from a read channel to be received out of order. The received data is subsequently reordered and provided to a host interface in order.

BACKGROUND

When a request for media is made by a host device, the host device typically requires that the data be returned in order. As a result, when requesting data from a storage device, one or more read gates that are issued to retrieve the data are issued in order. However, due to various processing delays that may occur on the data, such as for example, to correct any errors that may be present in the data, the data sectors may be returned out of order—that is, the data may be returned in an order that is different than the order that the read gates were issued.

It is with respect to these and other general considerations that embodiments have been made. Although relatively specific problems have been discussed, it should be understood that the embodiments should not be limited to solving the specific problems identified in the background.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

FIG. 2A-FIG. 2H illustrate an exemplary storage medium that stores received logical block address information associated with data that is received out of order according to one or more embodiments of the present disclosure;

DETAILED DESCRIPTION

Figure 1:
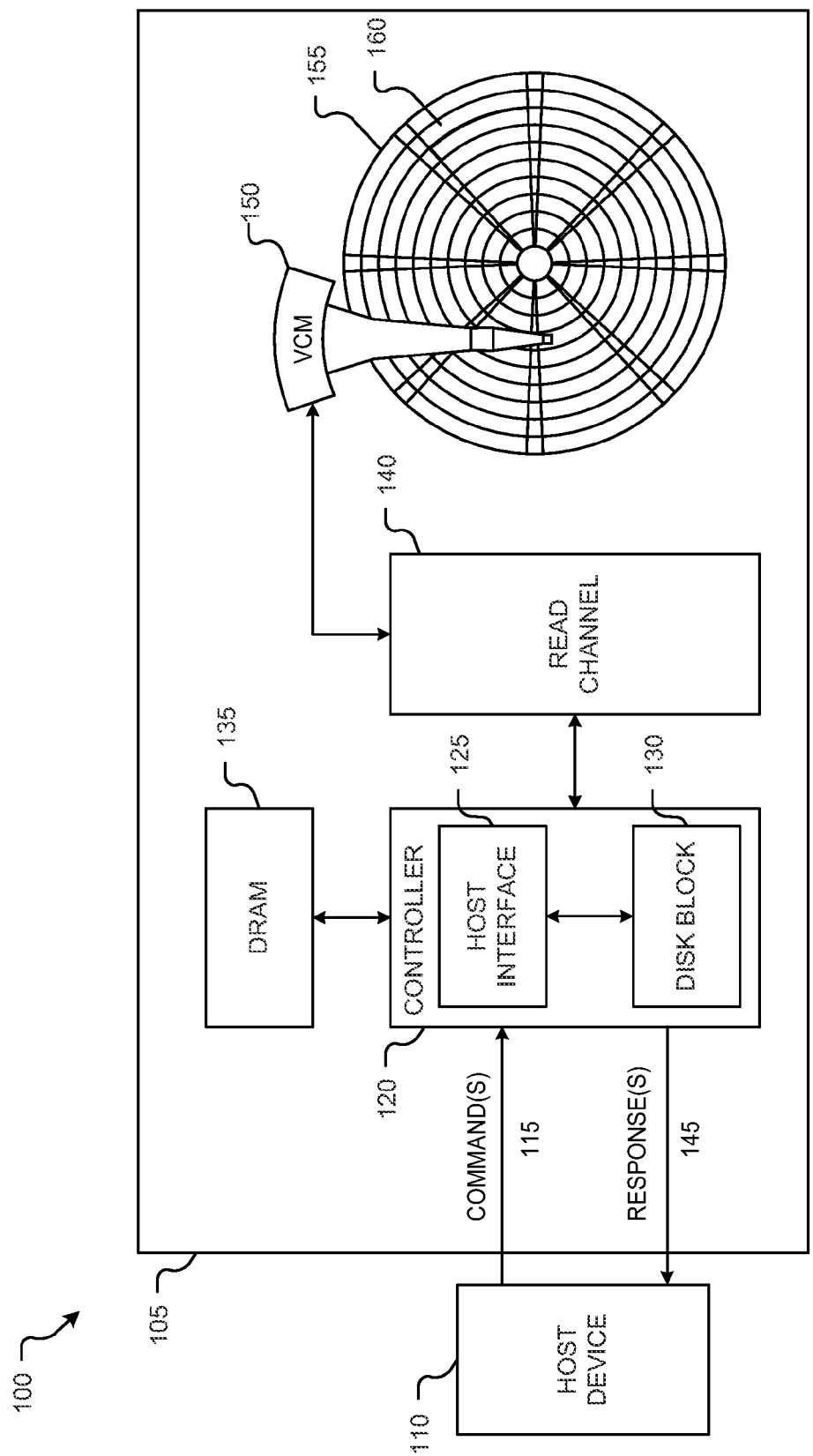
FIG. 1 illustrates an exemplary data storage system for that may be used with one or more embodiments of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein.

Some of the embodiments described herein are directed to systems and methods for returning read sector data from a hard disk controller out of order and subsequently reordering the out of order data. For example, in typical storage systems, the firmware of the storage system and/or the host interface typically process read sectors in logical block address (LBA) order. However, some of the data that is received may be received out of order. As such, disk block hardware within the hard disk controller may accept these out of order data sectors from a read channel and subsequently provide information that describes the available in-order sectors to the firmware and/or the host interface. More specifically, as out of order sector data is received from a read channel and placed in a memory, e.g., dynamic random access memory, an indicator or tag (e.g., a logical block address) of the sector is captured. Once this information is captured, a dynamic random access memory or other such storage device accumulates a record of the available out of order sectors and releases an indication of the available sectors that are in order.

More specifically, in some embodiments, a first portion of data having an associated first indicator is received and a second portion of data having an associated second indicator is also received from a media having data stored in a range of storage locations. The second indicator may be non-sequential with respect to the first indicator. Further, the first indicator is equivalent to a target starting location of the range of storage locations in which the requested data is located. The first indicator is associated with a range descriptor that is associated with the range of storage locations and the second indicator is associated with an auxiliary list associated with the range of storage locations. A third portion of data and an associated third indicator may then be received. Upon determining that the third indicator is sequential with respect to the first indicator, the third indicator is subsequently associated with the range descriptor. A count associated with the range of storage locations is then incremented. However, if it is determined that the third indicator is not sequential with respect to the first indicator, the third indicator is associated with the auxiliary list.

A data storage device having a read channel and a controller is also disclosed. In some embodiments, the controller is configured to receive a plurality of sequential data sectors and a plurality of non-sequential data sectors from the read channel. In some embodiments, each data sector may have an associated indicator. The controller stores the sequential indicators in a list of available ordered data sectors and also stores the non-sequential indicators in a list of non-sequential data sectors. When a subsequent data sector and an associated indicator is received from the read channel, a determination is made as to whether the indicator of the subsequent data sector is sequential with respect to the sequential indicators in the list of available ordered data sectors. Upon determining that the indicator of the subsequent data sector is sequential with respect to the sequential indicators, the list of available ordered data sectors is updated.

Turning to the figures, FIG. 1 illustrates an exemplary data storage system 100 for receiving and processing out of order data according to one or more embodiments of the present disclosure. As shown in FIG. 1, the system 100 includes a host device 110 that sends various commands 115 to a data storage device 105. In some embodiments, the commands 115 can be any number of media related commands including, but not necessarily limited to, random media read commands and sequential media read commands. Although read commands are specifically mentioned, the host device 110 may also issue various write commands such as, for example, random media write commands and sequential media write commands among others.

The host device 110 may be any suitable electronic device such as a laptop computer, desktop computer, server, cellular phone, tablet computer, and so on. In some embodiments, the host device 110 can be implemented as a system of individual electronic devices, such as, for example, a network of servers. In yet other embodiments, the host device 110 may be a processor or other component of the computing system that is local or remote with respect to the data storage device 105.

Once the commands 115 have been received and processed, the data storage device 105 may send one or more responses 145 to the host device 110. The responses 145 may include confirmation that the commands 115 have been processed and/or completed. In other embodiments, the responses 145 may also include any data requested by the commands 115. However, and as will be discussed in detail below, the data may be received by a controller 120 out of order, but the host device 110 may require that the data included in the response 145 be returned in a particular order.

As shown in FIG. 1, the data storage device 105 may include a controller 120 configured to service the commands 115 that are received from the host device 110. The controller 120 may also provide the responses 145 to the host device 110. Accordingly, when a command 115 is received by the controller 120, the controller 120 may issue one or more read gates to a read channel 140. The read channel 140 uses the issued read gates to find or otherwise access the data that is associated with the received command 115.

More specifically, when a read command is received, the controller 120 may instruct a servo system of the data storage device 105 to position a read/write element of a voice coil motor 150 over a particular zone 160 of the rotating magnetic storage 155 in response to a seek command. The data in that zone 160 is then processed by the read channel 140 and returned to the controller 120. Although a rotating magnetic storage 155 is specifically shown and discussed, the embodiments described herein may be used in any data storage device that returns data sectors out of order (e.g., storage device that uses other types of non-volatile memory such as solid-state memory).

In some embodiments, the read gates are issued to the read channel 140 in order. That is, if the data to be read is in sectors 0-6, read gates for those sectors may be issued in order (although this is not required). Although the read gates may be issued in order, the embodiments disclosed herein allow the read channel 140 to adapt the data recovery time of each sector that is read from the rotating magnetic storage 155. As such, the order of sectors that are read from the rotating magnetic storage 155 to the read channel 140 may differ than the order of sectors that are transferred from the read channel 140 to the controller 120.

More specifically, although the read gates may have been issued from the controller 120 to the read channel 140 in order, the read channel 140 may access, process and/or return the data to the controller 120 out of order. That is, as soon as the data is processed by the read channel 140, the data is returned to the controller 120. As a result, processing of a second data sector may complete before the processing of a first data sector is complete even though a read gate associated with the first data sector was issued before the read gate associated with the second data sector.

Once the data is received from the read channel 140, the returned data is stored by a memory such as a dynamic random access memory (DRAM) 135. More specifically, when the data is returned from the read channel 140, a logical block address associated with the data, as well as the context of the data, is received by a disk block 130. The disk block 130 stores which LBAs have been received and the data associated with the LBA is stored in the DRAM 135. In some embodiments, the disk block 130 may also communicate with the host interface 125 to inform the host interface 125 which sectors of data have been received and/or the number of in order sectors (and/or out of order data sectors) that have been received from the read channel 140. Once all the data has been returned, and more specifically, when the number of in order sectors is equivalent to the number of data sectors occupied by the data that was requested, the host interface 125 may return the data to the host device 110. Although DRAM 135 is depicted, it is understood that some embodiments may use other types of memory, including non-volatile memory such as MRAM (magnetoresistive random-access memory).

In some embodiments, as each sector of data is read by the read channel 140, the read channel 140 provides various metrics to the disk block 130. These metrics may include, but are not limited to, an identification of the read gate that was used to retrieve the data, the actual data that was retrieved (e.g., the data that is to be returned to the controller 120), as well as an indication that all the data associated with that issued read gate has been received. These metrics may be stored in the DRAM 135 and a LBA associated with this data may then be received and/or stored in the disk block 130 such as will be described below. As the data and each associated LBA (or other such indicator) is received, the disk block 130 may order the data that is received out of order and update the host interface 125 accordingly. An example of the ordering of received out of order data is explained in detail below.

FIG. 2A-FIG. 2H illustrate an exemplary storage medium that stores received logical block address information as that information is received from a read channel according to one or more embodiments of the present disclosure. In some embodiments, the data may be received out of order such as described above. Accordingly, as the data is being received, the data associated with the LBA may be stored in a DRAM, such as, for example, DRAM 135 (FIG. 1) while the tracking of the received LBAs may be performed by a disk block such as, for example, disk block 130 (FIG. 1).

As shown in FIG. 2A, the data storage medium or disk block may be divided into various sectors although this is not required. In the illustrated embodiment, the disk block may track the target LBA 200 (e.g., the starting LBA of the data transfer), a first range descriptor 210 (e.g., a range descriptor that tracks the number of LBAs that have been received and that can be placed in order before the target LBA 200, also referred to herein as a cache range descriptor), a second range descriptor 220 (e.g., a range descriptor that tracks the number of LBAs that have been received and that can be placed in order including the target LBA 200 and LBAs that are sequential with the target LBA 200), a list of LBAs 230 and/or associated data that have been received, and an auxiliary list or FIFO 240 that stores or otherwise tracks LBAs that have been received out of order.

For example and as shown in FIG. 2A, the target LBA 200 has been identified as block 10. That is, when a request for data is received, a controller of a data storage system may determine that the requested data begins at block 10 in the particular data storage device. Further, the controller may determine that the data spans a number of different and contiguous data sectors. As such, the controller may issue a number of read gates to a read channel to obtain the data. However, as discussed above, the data associated with each read gate may be returned out of order. Accordingly, the disk block may be configured to track and determine which sectors have been received so that the data can be returned to the host device in order.

Continuing with the example above, as a result of issued read gates, the read channel may return LBA 6 to the disk block such as shown in received LBAs 230 of FIG. 2B. However, because LBA 6 is less than the target LBA 10, LBA 6 is placed in the first range descriptor 210 as both the minimum LBA and the maximum LBA of the first range descriptor. A count associated with the first range descriptor 210 and that indicates the number of sequential LBAs is then incremented. In some embodiments, the first range descriptor may be subsequently used for caching data. For example and as will be shown below, the first range descriptor may track the number of available and sequential data sectors that have been received. As such, when a subsequent request for data is made, that data may have a target LBA that falls within the first range descriptor. As such, the data may be returned to the requesting device without having to access the media and request the data all over again.

Continuing with the example above and referring to FIG. 2C, a second LBA may be subsequently received. As shown in FIG. 2C, the second received LBA and its associated data may be the target LBA 200, LBA 10. Accordingly, LBA 10 is identified as both the minimum LBA and the maximum LBA of the second range descriptor 220. A count associated with the second range descriptor is then incremented.

When a third LBA and its associated data is received such as shown in FIG. 2D, a determination is made as to whether the third LBA is sequential with the LBAs in either the first range descriptor 210 or the second range descriptor 220. In the illustrated example, the third LBA is LBA 12. However, because LBA 12 is not sequential with respect to LBA 6 or LBA 10, LBA 12 is placed in the FIFO 240.

Continuing with the example, the next LBA that is received may be identified as LBA 14 such as shown in FIG. 2E. As with LBA 12, LBA 14 is not sequential with any of the received LBAs in the first range descriptor 210 or the second range descriptor 220 and, as a result, is placed in the FIFO 240.

As shown in FIG. 2F, the next LBA that is received is LBA 11. As LBA 11 is sequential with respect to LBA 10 in the second range descriptor 220, the maximum LBA, as well as the count (e.g., a number that indicates the current maximum sequence of received LBAs) in the second range descriptor 220 is incremented as shown. Once the count has been incremented, the FIFO 240 is checked to determine whether one or more entries in the FIFO 240 are now sequential with respect to the newly updated second range descriptor 220. Because LBA 12 is present in the FIFO 240 and because LBA 12 is sequential with respect to LBA 11, the maximum LBA and the count in the second range descriptor 220 is updated such as shown in FIG. 2G.

In some embodiments, the FIFO 240 is checked for sequential LBAs each time an LBA and its associated data is received—whether or not the range descriptors and their associated counts are updated. In other embodiments, the FIFO 240 is checked for sequential LBAs when either range descriptor and/or their associated counts are updated.

Referring to FIG. 2H, a sixth LBA may be subsequently received. As shown in FIG. 2H, the sixth LBA is LBA 7. Because LBA 7 is sequential with respect to LBA 6, the maximum range descriptor and the count associated with the first range descriptor is updated as shown.

In certain embodiments, the above described process may repeat until the count associated with the second range descriptor 220 reaches a determined count. That is, firmware associated with the data storage device may identify which series of sequential LBAs (e.g., indicated by a count of sequential LBAs) include the requested data. Accordingly, when the count associated with the second range descriptor 220 is equivalent to the number of sequential LBAs known by the firmware, the data associated with each LBA may be sent to the requesting device. In some embodiments, the data may be sent as soon as the identified count has been reached. In other embodiments, the data may be sent sector by sector as the sequence of sectors increases.

For example, and using the example set forth above, the data associated with LBA 10 may be sent once the data associated with LBA 10 is received. Data would not be sent again until the data associated with LBA 11 is received— even though the data associated with LBA 12 had already been received. Once the data associated with LBA 11 is sent to the requesting device, data associated with LBA 12 is subsequently sent to the requesting device.

Although first and second range descriptors are shown and described above, in certain embodiments, one or multiple range descriptors may be used. For example, separate ranges of valid sequential LBAs may be used even though all LBAs are not sequential. For example, a sequence of LBAs may have two entries, a second sequence of LBAs may have 4 entries and a third sequence of LBAs may have 10 entries with none of the LBAs being sequential with respect to one another.

It is also contemplated that the first range descriptor 210 may be combined with the second range descriptor 220 when the maximum LBA of the first range descriptor 210 is sequential with the minimum LBA (or target LBA) of the second range descriptor 220.

In addition to the above, if out of order data is generated from a multi-read operation, the embodiments described herein may be used to track a cumulative collection of good sectors. That is, if during the process of receiving LBAs one or more bad sectors are identified, the method may identify those bad sectors and subsequently indicate various ranges of good sectors that are available.

Figure 3:
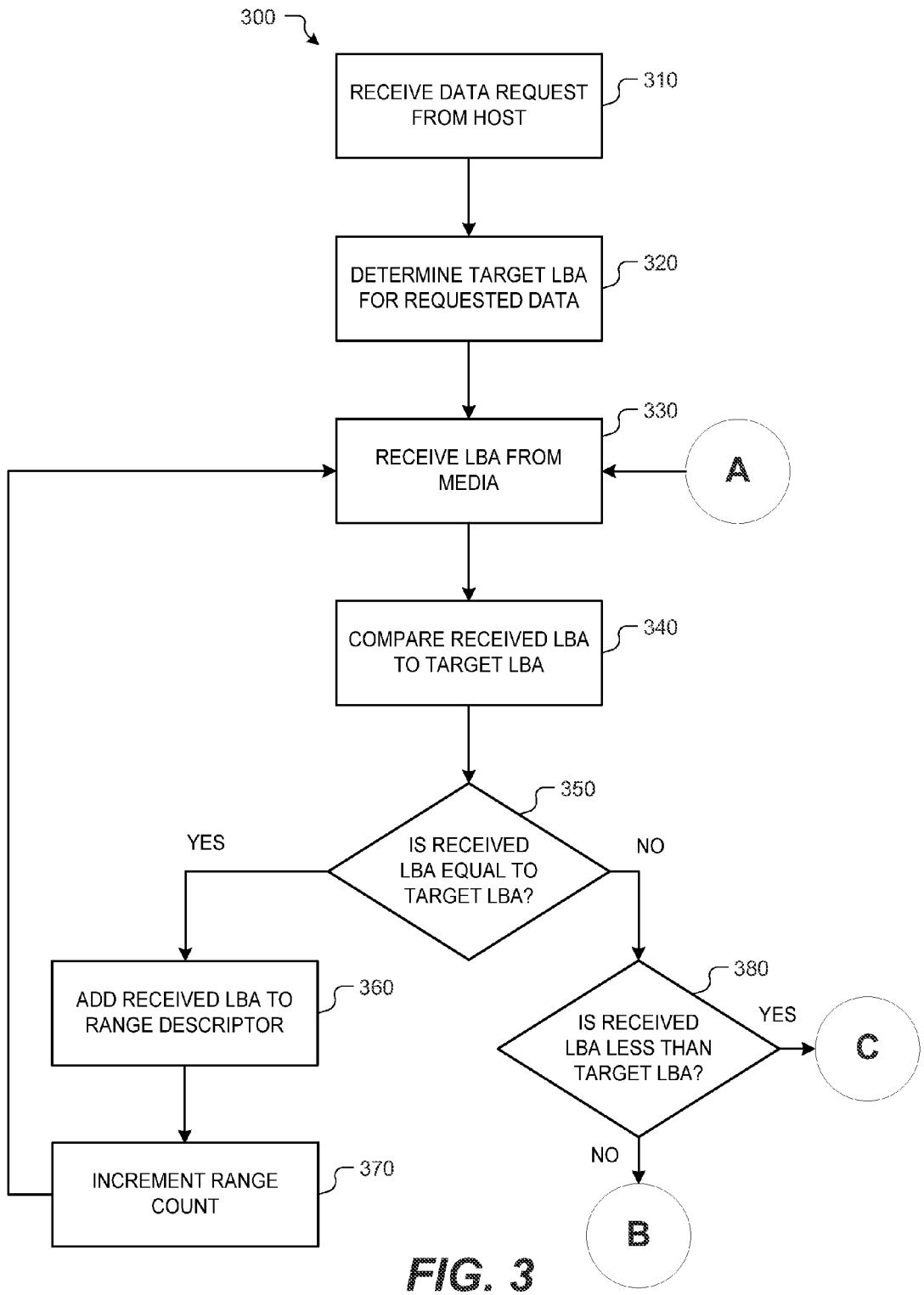
FIG. 3 illustrates a method for ordering data that is received out of order according to one or more embodiments of the present disclosure.
Figure 4:
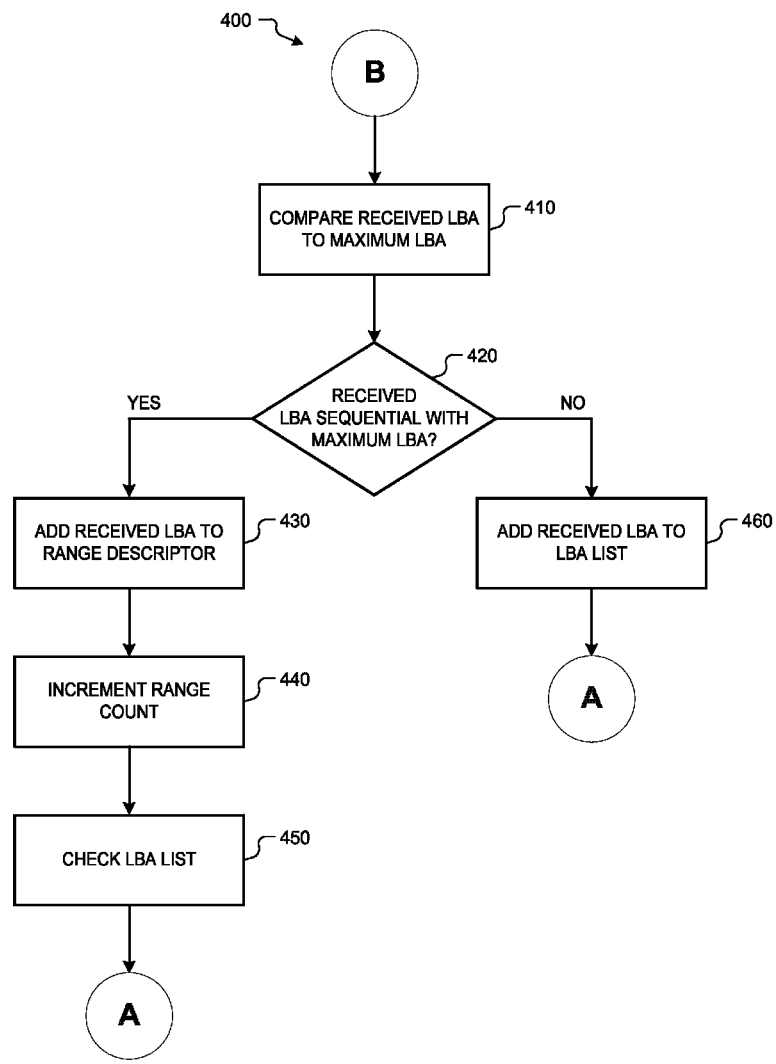
FIG. 4 illustrates a continuation of the method for ordering data that is received out of order according to one or more embodiments of the present disclosure.
Figure 5:
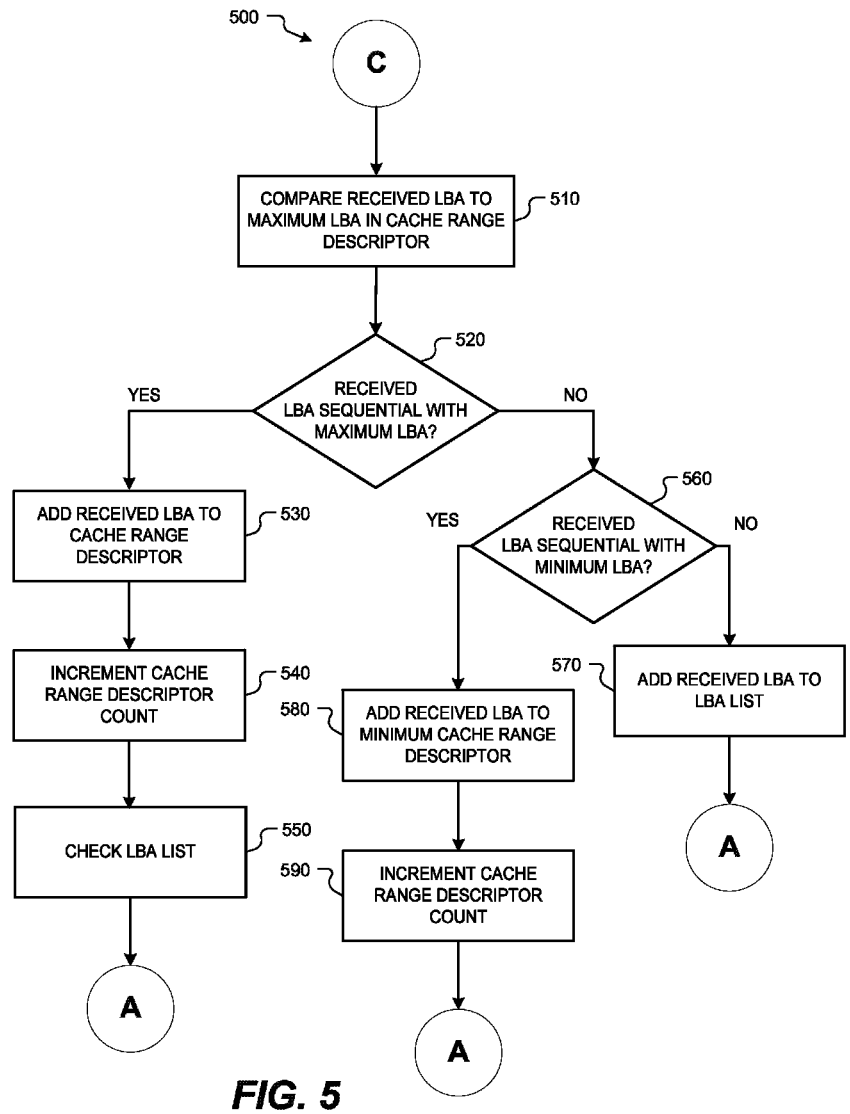
FIG. 5 illustrates a continuation of the method for ordering data that is received out of order according to one or more embodiments of the present disclosure.

FIG. 3-FIG. 5 illustrate a method for ordering data that is received out of order according to one or more embodiments of the present disclosure. For example, the method shown in these figures may be used to order LBAs that are received out of order such as was described above with respect to FIG. 2A-FIG. 2H.

Method 300 begins at operation 310 when a data request is received from a host device. Once the data request is received, flow proceeds to operation 320 and a determination is made as to the target LBA of the requested data. In some embodiments, the target LBA is the beginning of the requested data. That is, if the requested data spans 10 blocks or sectors and starts at block 8, the target LBA would be block 8.

Once the target LBA has been identified, flow proceeds to operation 330 and an LBA (along with its associated data) is received from the media. In some embodiments, the LBA is received from a read channel in response to a read gate that was issued as part of the request for data received in operation 310. That is, when a request for data is received, one or more read gates may be issued to a read channel that instructs the read channel to obtain the requested data.

Flow then proceeds to operation 340 and the received LBA is compared to the target LBA. A determination 350 is then made as to whether the received LBA is equal to the target LBA. If the received LBA is equivalent to the target LBA, flow proceeds to operation 360 and the received LBA is added to the range descriptor such as described above. More specifically, when the received LBA is equal to the target LBA (e.g., target LBA 200), the range descriptor (e.g., the second range descriptor 220) associated with the requested data is updated with the target LBA. Flow then proceeds to operation 370 and a count (e.g., $Count_B$) associated with the range descriptor is also incremented. Flow then proceeds back to operation 330 in which a subsequent LBA is received. The above described process may then repeat.

However, if it is determined in operation 350 that the received LBA is not equivalent to the target LBA, flow proceeds to operation 380 and a determination is made as to whether the received LBA is less than the target LBA. If the received LBA is not less than the target LBA, flow proceeds to method 400 shown as path B in FIG. 3.

Method 400 of FIG. 4 begins at operation 410 in which the received LBA (e.g., the LBA received in operation 330 of FIG. 3), is compared with a maximum LBA (e.g., Max. $LBA_B$) of the range descriptor associated with the requested data (e.g., the second range descriptor 220).

Flow then proceeds to operation 420 and a determination is made as to whether the received LBA is sequential with respect to the maximum LBA in the range descriptor. If it is determined that the received LBA is not sequential to the maximum LBA in the range descriptor, flow proceeds to operation 460 and the received LBA is added to an auxiliary LBA list (e.g., the FIFO 240). Flow then proceeds back to operation 330 of FIG. 3 such as indicated by path A and a subsequent LBA and its associated data may be received.

Referring back to operation 420, if it is determined that the received LBA is sequential with the maximum LBA in the range descriptor, flow proceeds to operation 430 and the received LBA is added to the range descriptor. That is, the maximum LBA of the range descriptor is updated to reflect that the newly received LBA is now the maximum LBA of the range descriptor. The range count of the range descriptor is incremented in operation 440 and the LBA list is checked 450 to determine whether any entries in the auxiliary list are sequential to the newly updated maximum LBA.

As discussed above, if an entry in the auxiliary list is sequential to the newly updated maximum LBA, the maximum LBA is again updated, the count is incremented and the auxiliary list is checked again. If there are no entries in the auxiliary list that are sequential to the newly updated maximum LBA, flow proceeds back to operation 330 (FIG. 3) and another LBA, and its associated data, is received.

Referring back to operation 380 of FIG. 3, if it is determined that the received LBA (e.g., the LBA that was first received in operation 330) is less than the target LBA, flow proceeds to method 500 such as shown by flow C. Method 500 begins at operation 510 in which the received LBA is compared to the maximum LBA (e.g., Max. $LBA_A$) in the cache range descriptor (e.g., the first range descriptor 210). As discussed above, the range of LBAs in the cache range descriptor may be used to cache data for subsequent read commands.

Once the received LBA is compared to the maximum LBA in the cache range descriptor, flow proceeds to operation 520 and a determination is made as to whether the received LBA is sequential with the maximum LBA in the cache range descriptor. If the received LBA is sequential to the maximum cache range descriptor, the maximum cache range descriptor is updated 530 with the received LBA, the cache range count (e.g., Max. $Count_A$) is incremented 540 and the LBA list (e.g., the FIFO 240) is checked to determine if any entries in the LBA list are sequential to the newly updated maximum cache range descriptor. If an entry in the LBA list is sequential with the newly updated maximum cache range descriptor, the sequential LBA in the LBA list is added to the cache range descriptor such as described above. Flow then proceeds back to operation 330 of FIG. 3 and a subsequent LBA is received.

Referring back to operation 520, if the received LBA (e.g., the LBA that was first received in operation 330) is not sequential with the maximum LBA in the cache range descriptor, flow proceeds to operation 560 and a determination is made as to whether the received LBA is sequential to the minimum LBA (e.g., Min. $LBA_A$) in the cache range descriptor. If the received LBA is not sequential to the minimum LBA in the cache range descriptor, flow proceeds to operation 570 and the received LBA is added to the LBA list (e.g., the FIFO 240). Flow then proceeds back to operation 330 of FIG. 3.

However, if it is determined in operation 560 that the received LBA is sequential (e.g., decrementally sequential) with the minimum LBA in the cache range descriptor, flow proceeds to operation 580 and the received LBA is added to the minimum cache range descriptor. For example if the minimum cache range descriptor was LBA 6 and the received LBA was LBA 5, the minimum cache range descriptor would be updated to reflect that LBA 5 is the new minimum range descriptor. Flow then proceeds to operation 590 and the count associated with the cache range descriptor is updated. Flow then proceeds back to operation 330 of FIG. 3 and a subsequent LBA is received.

Figure 6A:
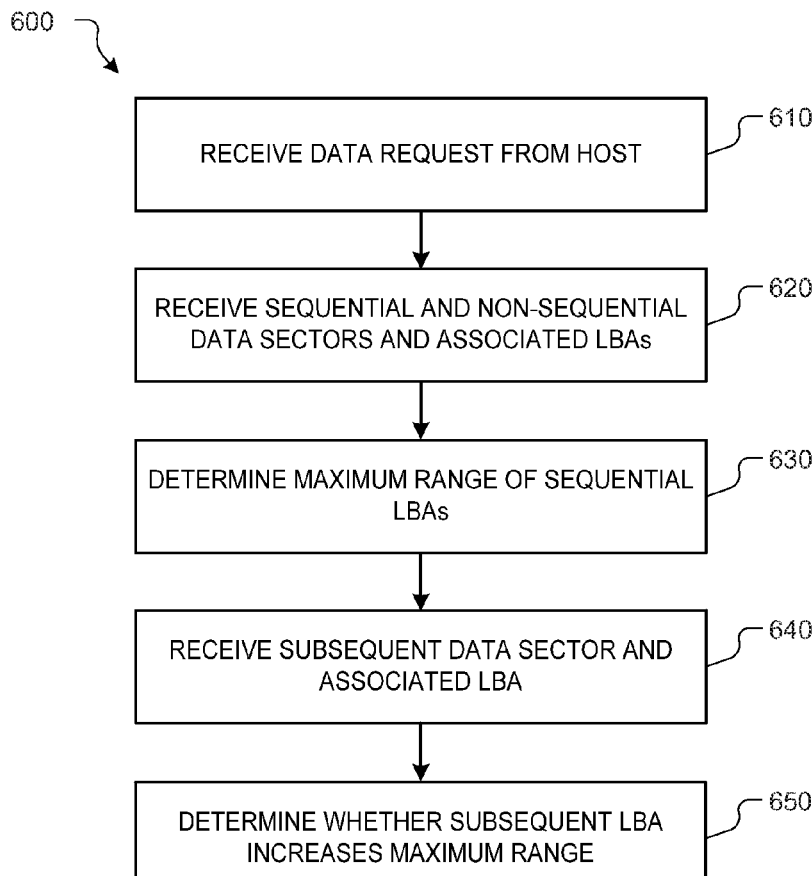
FIG. 6A-FIG. 6B are a block and a flow diagram combination that illustrate a method for ordering data that is received out of order according to one or more embodiments of the present disclosure.
Figure 6B:
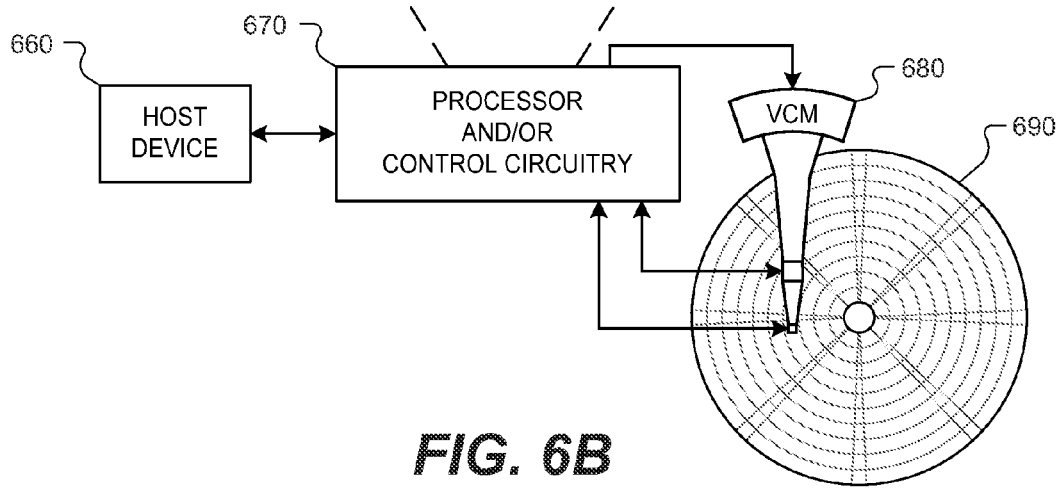

FIG. 6A-FIG. 6B are a block and a flow diagram combination that illustrate a method 600 for ordering data sectors that are received out of order according to one or more embodiments of the present disclosure. In some embodiments, the system of FIG. 6B described below may be similar to the system 100 described above.

Method 600 begins at operation 610 when a data request is received from a host device. In some implementations, the data request may be received by host device 660. Once the data request is received, flow proceeds to operation 620 and sequential and non-sequential data sectors are received. In certain embodiments, an indicator, such as, for example, an LBA, is also received or otherwise associated with each received data sector. For example and turning to FIG. 6B, the processor and/or control circuitry 670 may request and subsequently receive the sequential and non-sequential data sectors and their associated indicators from a rotating magnetic storage device 690 via a voice coil motor 680.

Once the sequential and non-sequential data sectors have been received, a determination 630 is made as to the maximum range of sequential LBAs. That is, as each data sector and its associated LBA are received, a determination is made as to which LBAs are sequential with respect to one or more previously received LBAs. Flow then proceeds to operation 640 in which a subsequent data sectors along with its associated indicator is received.

Once the subsequent data sector has been received, a determination 650 is made as to whether the subsequent LBA increases the determined maximum range of sequential LBAs. If the subsequent LBA increases the maximum LBA range, an auxiliary list is checked to determine if one or more additional LBAs that were previously received increase the maximum LBA range such as was described above. Once a count associated with the LBA range matches a determined LBA range (e.g., the count matches the number of data sectors that contains the requested data), the data may be returned to the host device 660.

In one embodiment, the above described methods may be embodied in a computer-readable medium encoding computer executable instructions which, when executed by a processor, performs the methods disclosed.

As used herein, "non-volatile solid-state memory," "non-volatile memory," "NVM," or variations thereof may refer to solid-state memory such as NAND flash. "Non-volatile memory" may additionally refer to rotating magnetic media. However, embodiments of the present disclosure may also be useful in other hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Additionally, embodiments of the present disclosure are described above with reference to block diagrams and operational illustrations of methods and the like. The operations described may occur out of the order as shown in any of the figures. One or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

I claim:

1. A method for reading data from a data storage device, the method comprising:
receiving, from a media having data stored in a range of storage locations,
a first portion of data and an associated first indicator, and
a second portion of data and an associated second indicator,
wherein the second indicator is non-sequential with respect to the first indicator and wherein the first indicator is equivalent to a target starting location of the range of storage locations;
associating the first indicator with a range descriptor associated with the range of storage locations;
associating the second indicator with an auxiliary list associated with the range of storage locations;
receiving a third portion of data and an associated third indicator;
upon determining that the third indicator is sequential with respect to the first indicator:
associating the third indicator with the range descriptor associated with the range of storage locations;
incrementing a count associated with the range of storage locations; and
determining whether the second indicator is sequential with respect to the third indicator; and
upon determining that the third indicator is not sequential with respect to the first indicator, associating the third indicator with the auxiliary list associated with the range of storage locations.

2. The method of claim 1, further comprising incrementing the count associated with the range of storage locations upon determining that the second indicator is sequential with respect to the third indicator.

3. The method of claim 1, wherein the first indicator, the second indicator and the third indicator are logical block addresses.

4. The method of claim 1, further comprising determining whether the count associated with the range of storage locations is equivalent to a count of data locations in the range of data locations.

5. The method of claim 4, further comprising processing the data associated with each indicator in sequence when the count associated with the range of storage locations is equivalent to the count of data locations in the range of data locations.

6. A data storage device, comprising:
a read channel; and
a controller configured to:
receive a plurality of sequential data sectors and a plurality of non-sequential data sectors from the read channel, wherein each data sector has an associated indicator;
store the sequential indicators in a list of available ordered data sectors;
store the non-sequential indicators in a list of non-sequential data sectors;
receive a subsequent data sector and an associated indicator from the read channel; and
in response to receiving the subsequent data sector:
determine whether the indicator of the subsequent data sector is sequential with respect to the sequential indicators in the list of available ordered data sectors; and
upon determining that the indicator of the subsequent data sector is sequential with respect to the sequential indicators:
update the list of available ordered data sectors; and
determine whether one or more non-sequential indicators in the list of non-sequential data sectors is sequential with respect to the indicator of the subsequent data sector.

7. The data storage device of claim 6, wherein the controller is further configured to increment a count associated with the number of sequential indicators in the list of available ordered data sectors.

8. The data storage device of claim 7, wherein the controller is further configured to process data in the sequential data sectors when the count associated with the number of sequential indicators reaches a predetermined threshold.

9. The data storage device of claim 6, wherein the indicators are logical block addresses.

10. The data storage device of claim 6, wherein the controller is further configured to store the indicator of the subsequent data sector in the list of non-sequential data sectors in response to determining that the indicator of the subsequent data sector is not sequential with respect to the sequential indicators in the list of available ordered data sectors.

11. The data storage device of claim 6, wherein the controller is further configured to return the sequential data sectors associated with the list of available ordered data sectors when the list of available ordered data sectors is equivalent to a desired range of data sectors.

12. An apparatus comprising a processor, wherein the processor is configured to:
receive a plurality of sequential data sectors and a plurality of non-sequential data sectors, wherein each data sector has an associated indicator;
store the sequential indicators in a list of available ordered data sectors;
store the non-sequential indicators in a list of non-sequential data sectors;
receive a subsequent data sector and an associated indicator; and
in response to receiving the subsequent data sector:
determine whether the indicator of the subsequent data sector is sequential with respect to the sequential indicators in the list of available ordered data sectors; and
upon determining that the indicator of the subsequent data sector is sequential with respect to the sequential indicators:
update the list of available ordered data sectors; and
determine whether one or more non-sequential indicators in the list of non-sequential data sectors is sequential with respect to the indicator of the subsequent data sector.

13. The apparatus of claim 12, wherein the processor is further configured to store the indicator of the subsequent data sector in the list of non-sequential data sectors in response to determining that the indicator of the subsequent data sector is not sequential with respect to the sequential indicators in the list of available ordered data sectors.

14. The apparatus of claim 12, wherein the indicators are logical block addresses.

15. The apparatus of claim 12, wherein the processor is further configured to increment a count associated with the number of sequential indicators in the list of available ordered data sectors.

16. The apparatus of claim 12, wherein the processor is further configured to return the sequential data sectors associated with the list of available ordered data sectors when the count associated with the list of available ordered data sectors is equivalent to a desired range of data sectors.

17. A method for reading data from a data storage device, the method comprising:
receiving, from a media having data stored in a range of storage locations,
a first portion of data and an associated first indicator, and a second portion of data and an associated second indicator,
wherein the second indicator is non-sequential with respect to the first indicator and wherein the first indicator is equivalent to a target starting location of the range of storage locations;
associating the first indicator with a range descriptor associated with the range of storage locations;
associating the second indicator with an auxiliary list associated with the range of storage locations;
receiving a third portion of data and an associated third indicator;
upon determining that the third indicator is sequential with respect to the first indicator:
associating the third indicator with the range descriptor associated with the range of storage locations; and
incrementing a count associated with the range of storage locations;
upon determining that the third indicator is not sequential with respect to the first indicator, associating the third indicator with the auxiliary list associated with the range of storage locations; and
in response to receiving the third portion of data, determining whether one or more indicators associated with the auxiliary list, and different from the third indicator, are sequential with respect to an indicator associated with the range descriptor.

18. A data storage device, comprising:
a read channel; and
a controller configured to:
receive a plurality of sequential data sectors and a plurality of non-sequential data sectors from the read channel, wherein each data sector has an associated indicator;
store the sequential indicators in a list of available ordered data sectors;
store the non-sequential indicators in a list of non-sequential data sectors;
receive a subsequent data sector and an associated indicator from the read channel; and
in response to receiving the subsequent data sector:
determine whether the indicator of the subsequent data sector is sequential with respect to the sequential indicators in the list of available ordered data sectors;
upon determining that the indicator of the subsequent data sector is sequential with respect to the sequential indicators, update the list of available ordered data sectors; and
determine whether one or more non-sequential indicators in the list of non-sequential data sectors, and different from the indicator of the subsequent data sector, are sequential with respect to an indicator in the list of available ordered data sectors.

19. An apparatus comprising a processor, wherein the processor is configured to:
receive a plurality of sequential data sectors and a plurality of non-sequential data sectors, wherein each data sector has an associated indicator;
store the sequential indicators in a list of available ordered data sectors;
store the non-sequential indicators in a list of non-sequential data sectors;
receive a subsequent data sector and an associated indicator; and
in response to receiving the subsequent data sector:

determine whether the indicator of the subsequent data sector is sequential with respect to the sequential indicators in the list of available ordered data sectors;

upon determining that the indicator of the subsequent data sector is sequential with respect to the sequential indicators, update the list of available ordered data sectors; and determine whether one or more non-sequential indicators in the list of non-sequential data sectors, and different from the indicator of the subsequent data sector, are sequential with respect to an indicator in the list of available ordered data sectors.

\* \* \* \* \*